US008842382B2

(12) United States Patent
Park et al.

(10) Patent No.: US 8,842,382 B2
(45) Date of Patent: Sep. 23, 2014

(54) POSITION SENSOR ASSEMBLY AND OPTICAL DEVICE INCLUDING THE SAME

(75) Inventors: Chi-young Park, Suwon-si (KR);
Kwang-seok Byon, Yongin-si (KR);
Jung-soo Kim, Suwon-si (KR);
Jin-young Bang, Yongin-si (KR);
Young-jae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 13/370,411

(22) Filed: Feb. 10, 2012

(65) Prior Publication Data

US 2013/0027790 A1 Jan. 31, 2013

(30) Foreign Application Priority Data

Jul. 26, 2011 (KR) ........................ 10-2011-0074121

(51) Int. Cl.
*G02B 7/02* (2006.01)

(52) U.S. Cl.
USPC .......................................... 359/814; 359/824

(58) Field of Classification Search
USPC .................................. 359/813, 814, 822, 824
See application file for complete search history.

(56) References Cited

U.S. PATENT DOCUMENTS

| 7,983,551 B2 * | 7/2011 | Chang ............................ 396/133 |
| 7,986,478 B2 * | 7/2011 | Yamashita et al. ............ 359/824 |
| 2007/0047108 A1 * | 3/2007 | Chang et al. ................... 359/813 |
| 2009/0128637 A1 | 5/2009 | Noji |
| 2011/0102665 A1 * | 5/2011 | Takei ............................ 348/373 |

* cited by examiner

*Primary Examiner* — Alicia M Harrington
(74) *Attorney, Agent, or Firm* — Drinker Biddle & Reath LLP

(57) ABSTRACT

Position sensor assemblies having compact structures and capable of precisely sensing a position change, and optical devices including the same are disclosed. A position sensor assembly is provided that includes: a sensing unit that outputs a signal varying as a magnetic force varies; and a magnet spaced apart from the sensing unit and i movably disposed with respect to the sensing unit, and comprising protrusion units of opposite polarities that protrude from each end portion of the magnet in one surface of the magnet toward the sensing unit.

12 Claims, 6 Drawing Sheets

POSITION SENSOR ASSEMBLY AND OPTICAL DEVICE INCLUDING THE SAME

CROSS-REFERENCE TO RELATED PATENT APPLICATION

This application claims the priority benefit of Korean Patent Application No. 10-2011-0074121, filed on Jul. 26, 2011, in the Korean Intellectual Property Office, the entirety of which is incorporated herein by reference.

BACKGROUND

1. Field of the Invention

Embodiments relate to position sensor assemblies and optical devices including the same, and more particularly, to position sensor assemblies having compact structures and capable of precisely sensing a position change, and optical devices including the same.

2. Description of the Related Art

Digital cameras store images of a subject as photographic images or moving images in a digital format. Examples of such digital cameras are a digital still camera (DSC), a digital video camera (DVC), and a digital camera module mounted in a mobile phone.

Optical devices may be used in the digital cameras, and for example, may adjust a light path using an optical element such as a lens or an optical filter. The optical devices may also focus light for an image pickup operation to form an image.

Furthermore, position sensor assemblies may be used to sense a position of an optical element, for example, when a digital camera adjusts the position of the optical element.

SUMMARY

One or more embodiments provide position sensor assemblies having compact structures and capable of precisely sensing a position change, and optical devices including the same.

One or more embodiments provide position sensor assemblies capable of minimizing a gap between a magnet and a sensing unit and precisely sensing a position change, and optical devices including the same.

According to an embodiment, there is provided a position sensor assembly including: a sensing unit that outputs a signal varying as a magnetic force varies; and a magnet spaced apart from the sensing unit and movably disposed with respect to the sensing unit, and comprising protrusion units of opposite polarities that protrude from each end portion of the magnet in one surface of the magnet toward the sensing unit.

The one surface of the magnet may form a concave curved surface from the protrusion units toward a center.

The one surface of the magnet may form a concave inclined surface from the protrusion units toward a center.

A groove may be formed in the one surface of the magnet. The sensing unit may be disposed outside of a virtual line connecting the protrusion units protruding from both end portions of the magnet.

According to another embodiment, there is provided another optical device including: an optical element through which light may be transmitted; a frame that supports the optical element; a base that movably supports the frame; a driving unit that generates a magnetic force to move the frame with respect to the base; a magnet disposed in one of the frame and the base, and comprising protrusion units of opposite polarity protruding from each end portion of the magnet in one edge thereof; and a sensing unit disposed in the other one of the frame and the base to correspond to the magnet, which senses a change of magnetic force according to a relative position change with respect to the magnet, and outputs a signal.

The driving unit may include a coil disposed in the other one of the frame and the base to correspond to the magnet, wherein the frame moves with respect to the base according to a change of a magnetic force generated by the coil.

The driving unit may include an ultrasonic motor.

BRIEF DESCRIPTION OF THE DRAWINGS

The above and other features and advantages will become more apparent in review of detailed exemplary embodiments with reference to the attached drawings in which.

DETAILED DESCRIPTION

Embodiments are described more fully with reference to the accompanying drawings, in which exemplary embodiments are shown.

Figure 1:
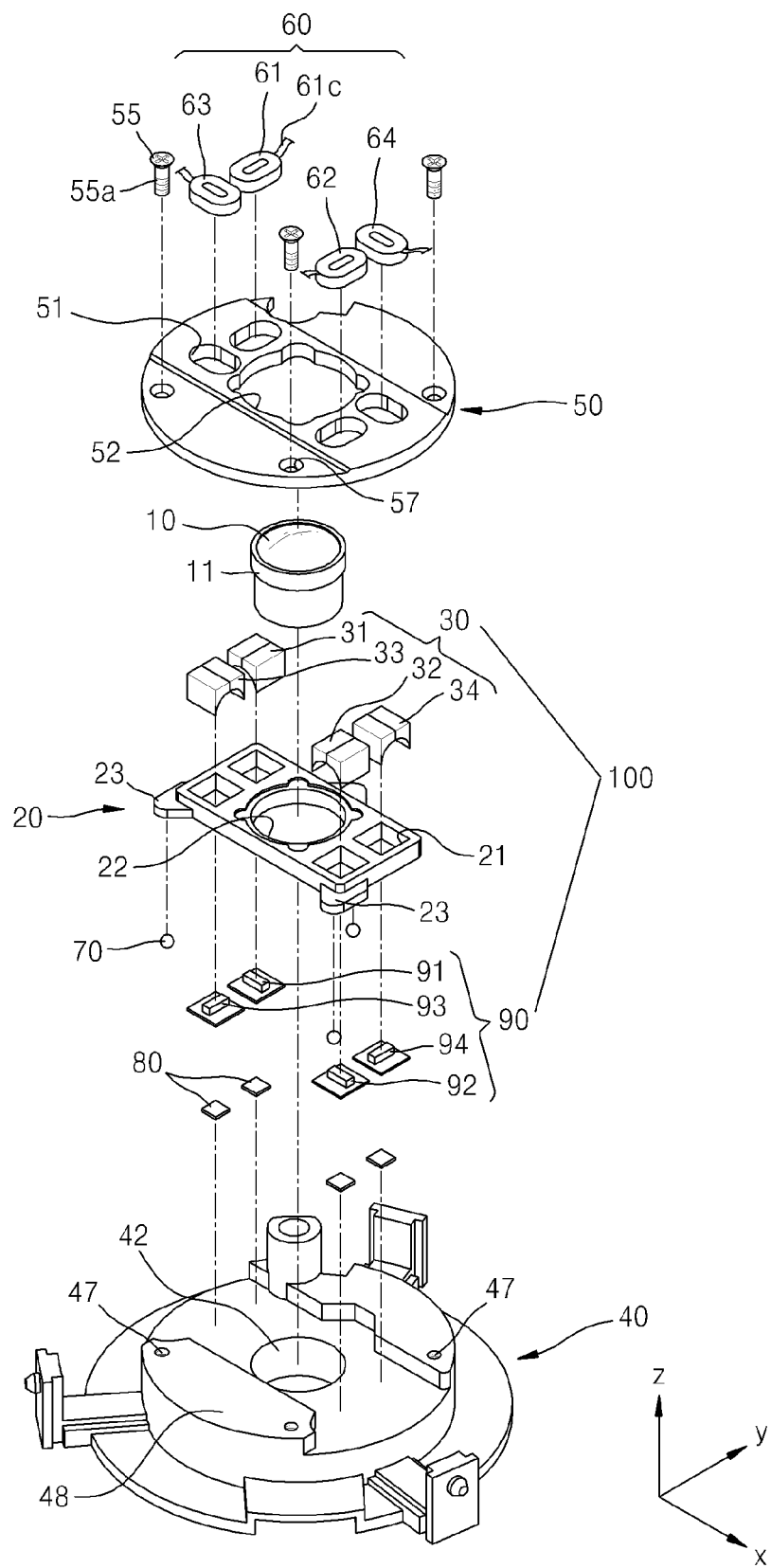
FIG. 1 is a disassembled perspective view illustrating components of an optical device including a position sensor assembly, according to an embodiment.
Figure 2:
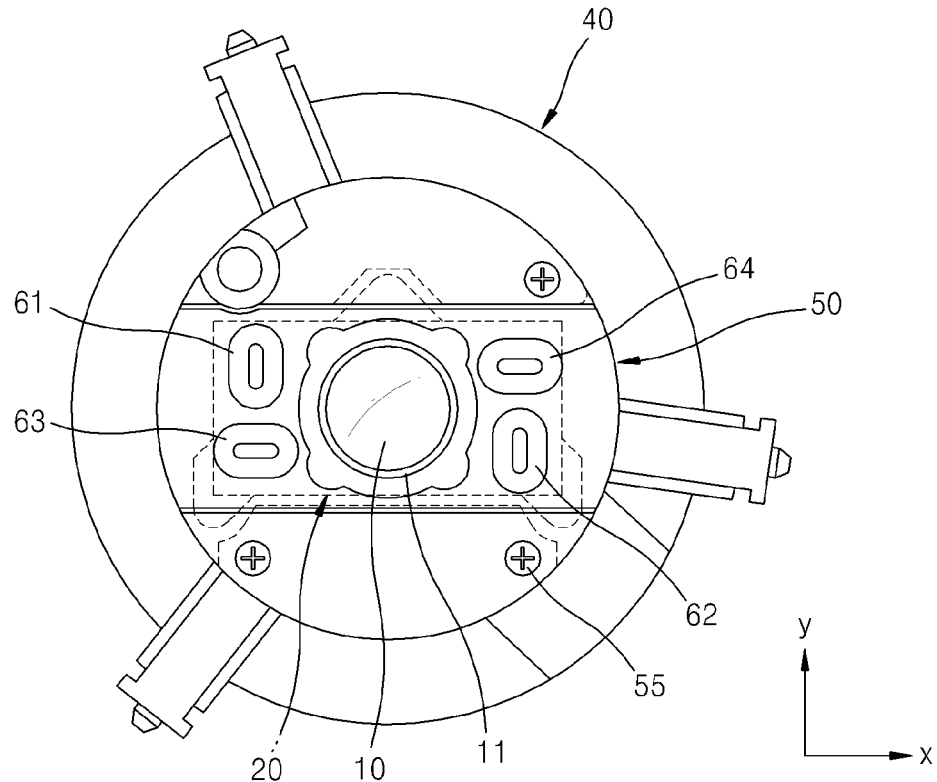
FIG. 2 is a plan view illustrating an assembled state of the optical device of FIG. 1.

FIG. 1 is a disassembled perspective view illustrating components of an optical device including a position sensor assembly 100 according to an embodiment, and FIG. 2 is a plan view illustrating an assembled state of the optical device of FIG. 1.

The optical device illustrated in FIGS. 1 and 2 can include an optical element 10 through which light can be transmitted, a frame 20 that movably supports the optical element 10, a base 40 that movably supports the frame 20, a driving assembly 60 that generates a driving force for moving the frame 20, a magnet assembly 30, and a magnetic sensing assembly 90.

The optical element 10 can transmit light. For example, the optical element 10 may be formed of one lens or a lens assembly including a plurality of lenses and a filter.

The optical element 10 can include a support body 11 as an outer boundary thereof to be coupled to a through hole 22 of the frame 20.

The magnet assembly 30 is disposed in the frame 20. The magnet assembly 30 includes first magnets 31 and 32 having magnetic poles disposed in a first direction (X-axial direction), and second magnets 33 and 34 having magnetic poles disposed in a second direction (Y-axial direction). The magnet assembly 30 can be inserted into mounting grooves, slots or holes 21 of the frame 20 formed around the through hole 22, and thus may be disposed around the optical element 10.

The base unit 40 movably supports the frame 20. That is, the frame 20 may move in the first direction (X-axial direction) crossing an optical axis (Z-axial direction) through which the optical element 10 may pass and in the second direction (Y-axial direction) crossing the optical axis and the first axis. Since the frame 20 supports the optical element 10, the optical element 10 may move relative to the base 40.

In the optical device illustrated in FIGS. 1 and 2, a plurality of ball bearings 70 are disposed between the frame 20 and the base 40. The ball bearings 70 movably support the frame 20 with respect to the base 40. The ball bearings 70 can movably support a bearing support portion 23, which can protrude from an outer boundary of the frame 20, with respect to the base unit 40.

However, embodiments are not limited to the ball bearings 70. Alternatively, the frame 20 may be movably mounted to the base 40 using other mechanical elements or electronic elements.

When images that are obtained from an imaging device (not shown) may not be clear due to a shake or a shaking, such as a hand shake, the shake may be corrected by moving the optical element 10 so that the obtained images may become clearer.

The optical device can be disposed on the optical axis of a barrel including a plurality of lenses, and may be disposed between the lenses. When unclear images may be obtained due to a shake such as a hand shake, the optical device may be moved across the optical axis to correct the shake.

The base 40 can include a through hole 42 in a position corresponding to the optical element 10. Light that has transmitted through the optical element 10 can be transmitted through the through hole 42.

A cover unit 50 is disposed to cover the magnet assembly 30. The cover unit 50 can be coupled to a wall portion 48 that protrudes from the base 40 and protrudes around the frame 20 to cover the magnet assembly 30.

A plurality of screw grooves 47 can be formed in the wall portion 48, and holes 57 can be formed in the cover unit 50 in positions respectively corresponding to the screw grooves 47. The cover unit 50 can be coupled to the base 40 by screw-coupling a coupling unit 55 into the screw grooves 47 through the holes 57. A threaded surface 55a can be formed on an outer portion of the coupling unit 55.

Groove portions 51 can be respectively formed in the cover unit 50 in positions corresponding to the magnets 31-34 of the magnet assembly 30. Driving units 61-64 of the driving assembly 60 can be respectively inserted in the groove portions 51. When an electrical signal is applied from the outside, the driving assembly 60 formed of, for example, a coil may generate magnetic force(s). An electrical signal from the outside may be applied to each of the driving units 61-64 via one or more printed circuit boards 61c.

First driving units 61 and 62 of the driving assembly 60 correspond to the first magnets 31 and 32, respectively, and second driving units 63 and 64 thereof correspond to the second magnets 33 and 34, respectively. The driving units 61-64 can generate magnetic force(s) to generate driving force(s) for moving the frame 20. The first driving units 61 and 62 may generate magnetic force(s) to move the frame 20 in the X-axial direction. The second driving units 63 and 64 may generate magnetic force(s) to move the frame 20 in the Y-axial direction.

The cover unit 50 may be formed of, for example, an insulating plastic material or a metal. The cover unit 50 can include a through hole 52 corresponding to the optical element 10. Light can pass through the through hole 52 of the cover unit 50 onto the optical element 10.

A plurality of iron plates 80 can be installed on the base 40 at positions respectively corresponding to the magnets 31-34 of the magnet assembly 30. Magnetic force can act between the iron plates 80 and the magnets 31-34. If no electrical signal is applied to the driving assembly 60, the driving assembly 60 does not generate magnetic force, and the frame 20 may return to an original position in a first assembled state by the magnetic force(s) acting between the iron plates 80 and the magnets 31-34.

The magnetic sensing assembly 90 for sensing the magnet assembly 30 is disposed in the base 40. The magnetic sensing assembly 90 of FIGS. 1 and 2 may include, for example, one or more hall sensors that operate using the principle that an induced current (or voltage) changes according to intensity of a magnetic field.

The magnetic sensing assembly 90 includes first sensing units 91 and 92 for sensing position changes of the first magnets 31 and 32, and second sensing units 93 and 94 for sensing position changes of the second magnets 33 and 34.

The sensor assembly 100 performs a function of sensing a relative position change of the frame 20 with respect to the base 40. The sensor assembly 100 includes the magnetic sensing assembly 90 and the magnet assembly 30.

Although the sensor assembly 100 that senses the position change of the frame 20 and the driving assembly 60, which drives the frame 20, share the magnet assembly 30 in the present embodiment, the embodiments are not limited thereto. For example, a magnet for driving the frame 20 and a magnet for sensing the position change of the frame 20 may be independently installed.

Although the driving assembly 60 that generates magnetic force if an electrical signal is applied and the magnet assembly 30 are used to move the frame 20 with respect to the base 40 in the present embodiment, the embodiments are not limited thereto. The frame 20 may be driven, for example, by connecting the base 40 and the frame 20 using a rectilinear motion guide, and transferring driving force to the frame 20 using a driving unit such as a step motor or a piezoelectric element actuator.

Figure 3:
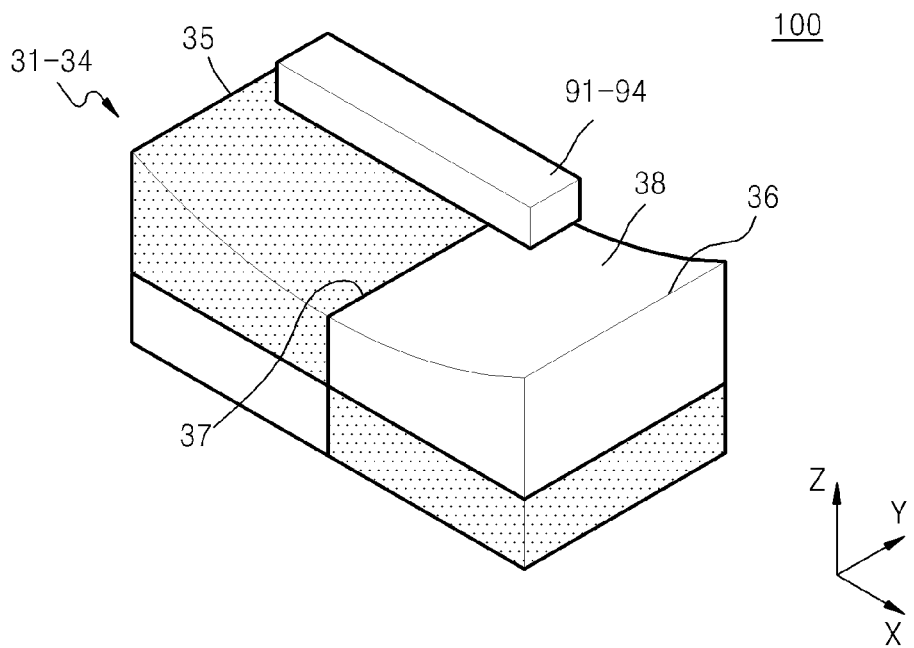
FIG. 3 is a schematic perspective view of the position sensor assembly of the optical device of FIG. 1.
Figure 4:
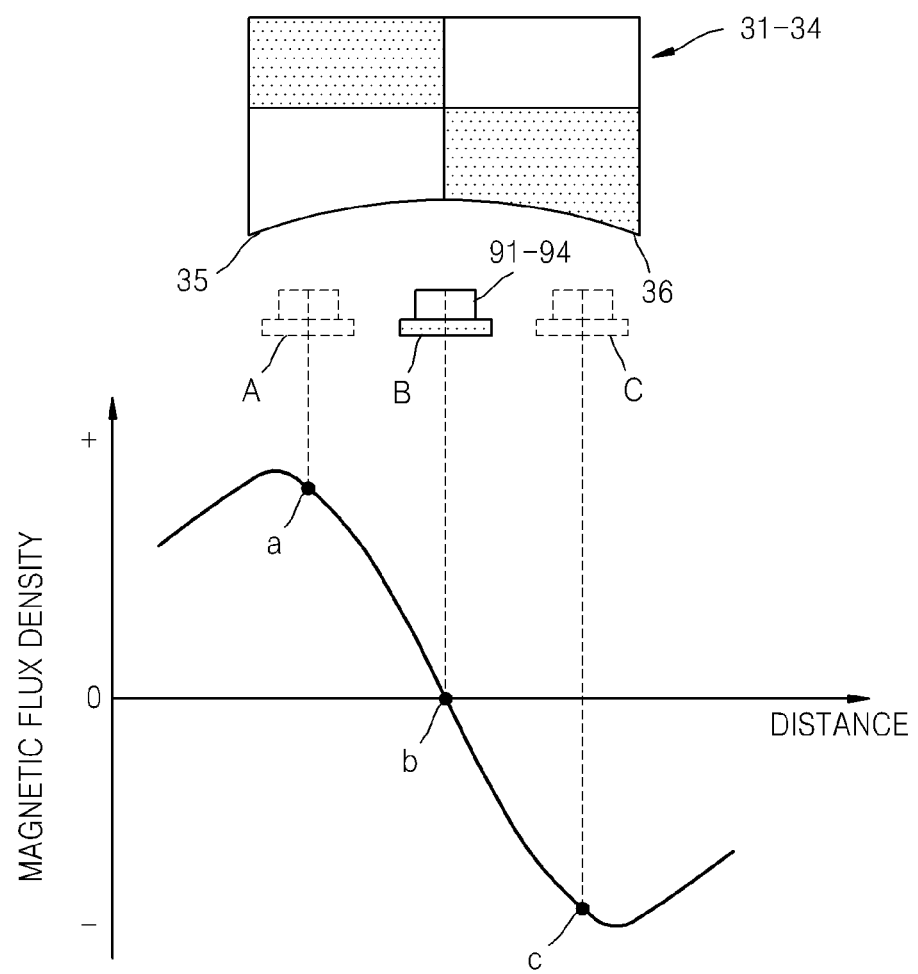
FIG. 4 is a conceptual diagram for explaining an operation of a magnetic sensing assembly of the position sensor assembly of the optical device of FIG. 3.

FIG. 3 is a schematic perspective view of the position sensor assembly 100 of the optical device of FIG. 1. FIG. 4 is a conceptual diagram for explaining an operation of the magnetic sensing assembly 90 of the position sensor assembly 100 of the optical device of FIG. 3.

The position sensor assembly 100 includes the sensing units 91-94 of the magnetic sensing assembly 90, which output a signal varying as a magnetic force varies, and the magnets 31-34 of the magnet assembly 30, which are spaced apart from the sensing units 91-94 and are movably disposed with respect to the sensing units 91-94.

Each of the magnets 31-34 includes protrusion units 35 and 36 of opposite polarities that protrude from each end portion in one surface 38 toward the sensing units 91-94. In FIG. 3, the one surface 38 of the magnet 31-34 forms a curved surface that is concavely curved from the protrusion units 35 and 36 toward a center 37.

The one surface 38 of the magnet 31-34 forms the curved surface, thereby increasing precision of the signal output by the sensing units 91-94.

When the optical device is installed in an imaging device such as a digital camera or a digital camcorder, a small space between the magnetic sensing assembly 90 and the magnet assembly 30 must be implemented to realize a compact design of the optical device. However, the smaller the space between the magnetic sensing assembly 90 and the magnet assembly 30, the more the linearity of the signal output by the magnetic sensing assembly 90 by sensing a change of the magnetic force deteriorates. That is, although the magnetic sensing assembly 90 should output a sensing signal in direct proportion to a position change of the magnet assembly 30, too small of a space between the magnetic sensing assembly 90 and the magnet assembly 30 does not allow the sensing signal to precisely reflect the position change of the magnet assembly 30. This is because a magnetic flux density of the magnet assembly 30 influencing the magnetic sensing assembly 90 does not uniformly change when the magnetic sensing assembly 90 and the magnet assembly 30 are disposed too closely each other.

The magnets 31-34 include the protrusion units 35 and 36 of opposite polarities that protrude from each end portion in the present embodiment, thereby increasing output precision of the magnetic sensing assembly 90. In more detail, when relative positions of one of the magnets 31-34 and a corresponding one of the sensing units 91-94 change between points A, B, and C of FIG. 4, the magnetic flux density of the magnet 31-34 sensed by the sensing unit 91-94 is substantially more uniform. Therefore, even when the space between the magnet assembly 30 and the magnetic sensing assembly 90 is very small, the linearity of the sensing signal output by the magnetic sensing assembly 90 can be substantially improved for positions a, b, and c, as shown in FIG. 4.

FIGS. 5A through 5D are schematic sectional views of example structural modifications of the position sensor assembly 100 of the optical device of FIG. 1.

In FIGS. 5A through 5D, a shape of a magnet 230 is modified while a space between the magnet 230 and a sensing unit 290 remains constant.

Figure 5A:
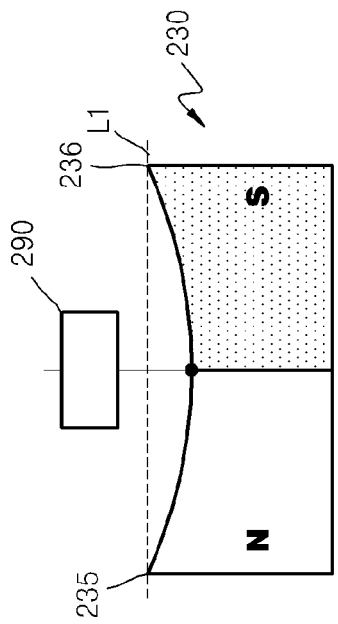
FIGS. 5A through 5D are schematic sectional views of example structural modifications of the position sensor assembly of the optical device of FIG. 1.

In a first modification shown in FIG. 5A, one surface of the magnet 230 toward the sensing unit 290 maintains flat.

Figure 5B:
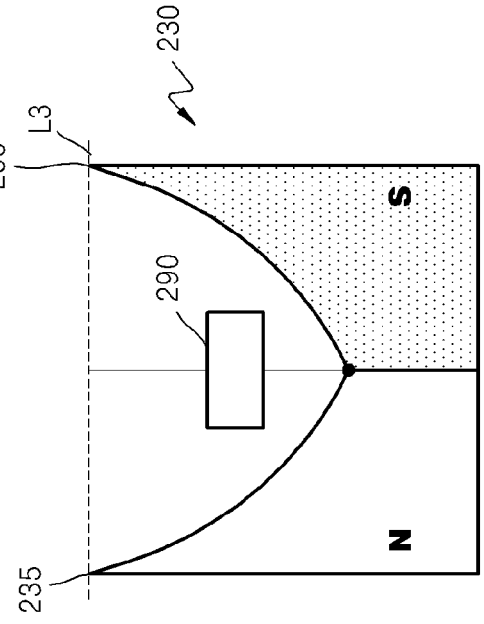

In a second modification shown in FIG. 5B, the magnet 230 includes protrusion units 235 and 236 protruding from both end portions thereof and forming a curved surface toward the sensing unit 290. In a third modification shown in FIG. 5C, the magnet 230 includes the protrusion units 235 and 236 protruding from both end portions thereof and forming a curved surface toward the sensing unit 290.

Figure 5C:
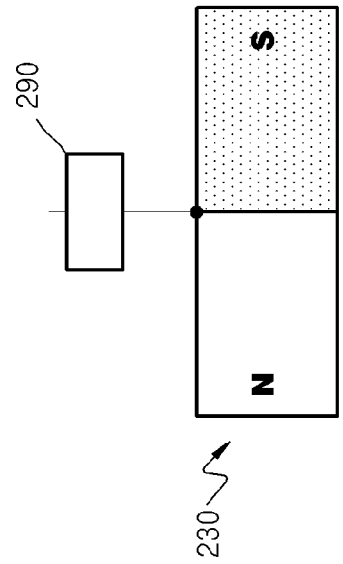

In the second and third modifications shown in FIGS. 5B and 5C, the sensing unit 290 is disposed, with respect to the magnet 230, outside of respective virtual lines L1 and L2 connecting the protrusion units 235 and 236, which protrude from both end portions of the magnet 230.

Figure 5D:
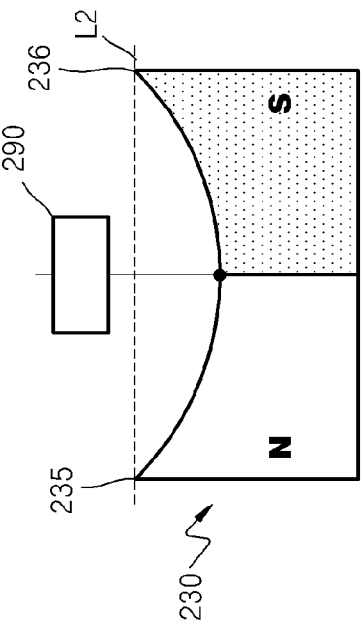

Although the magnet 230 includes the protrusion units 235 and 236 protruding from both end portions thereof in a fourth modification shown in FIG. 5D, a concave curved surface of the magnet 230 toward the sensing unit 290 has a greater curvature radius compared to the second and third modifications. Further, in the fourth modification, the sensing unit 290 is disposed inside a virtual line L3 connecting the protrusion units 235 and 236, and thus a position of the sensing unit 290 is different from those in the second and third modifications.

Figure 6:
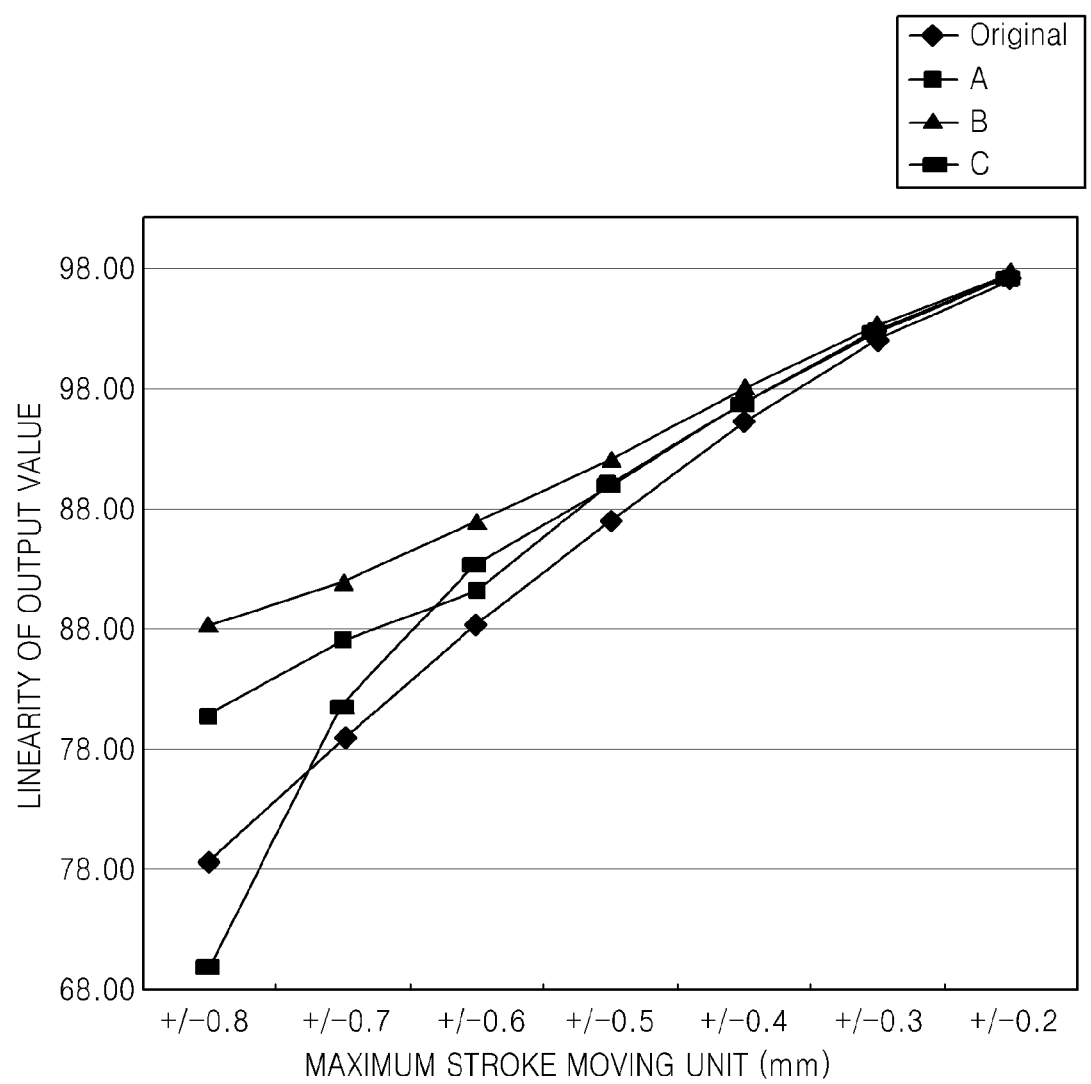
FIG. 6 is a graph showing linearity of an output signal with respect to a movement distance for each modification of FIGS. 5A through 5D.

FIG. 6 is a graph showing linearity of an output signal with respect to a movement distance in each of the first through fourth modifications of FIGS. 5A through 5D.

Referring to FIG. 6, a line "Original" corresponds to the first modification shown in FIG. 5A, and lines "A", "B", and "C" correspond to the second through fourth modifications shown in FIGS. 5B through 5D, respectively.

A horizontal axis of the graph indicates a position change (stroke, unit: mm), and a vertical axis thereof indicates the linearity (unit: percentage) of the output signal of the magnet sensing unit 290 with respect to the movement distance. As the linearity increases (e.g., gets closer to 100%), the signal of the magnet sensing unit 290 can be more precisely measured in proportion to the movement distance. As the linearity decreases, the signal of the magnet sensing unit 290 is less precisely measured.

The line "Original" corresponding to the first modification of FIG. 5A shows that a slight position change greatly deteriorates the linearity of the output signal.

However, the lines "A" and "B" corresponding to the second and third modifications of FIGS. 5B and 5C, respectively, show that the linearity of the output signal is substantially better than that of the first modification of FIG. 5A. To the contrary, the line "C" corresponding to the fourth modification of FIG. 5D shows that the linearity of the output signal deteriorates similar to the line "Original". Thus, the position sensor assembly 100 and an imaging device of the present embodiment can precisely sense a position change by disposing the magnet sensing unit 290 outside the virtual lines L1 and L2 connecting the protrusion units 235 and 236 protruding from both end portions of the magnet 230 as shown in the second and third modifications of FIGS. 5B and 5C.

Figure 7:
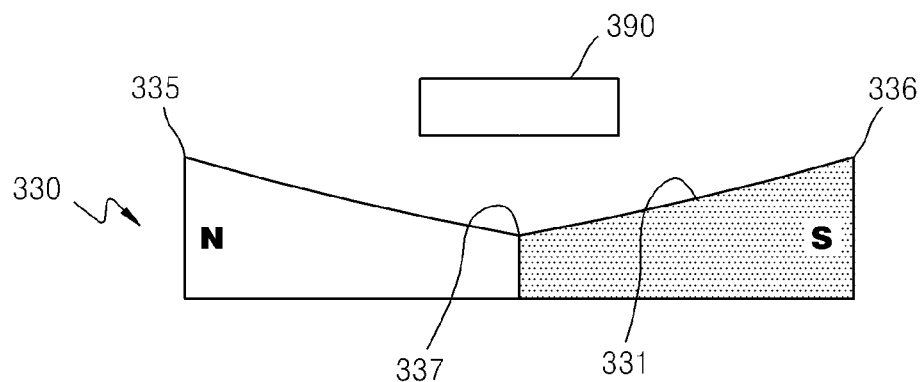
FIG. 7 is a lateral sectional view illustrating a position sensor assembly, according to another embodiment.

FIG. 7 is a lateral sectional view illustrating a position sensor assembly according to another embodiment.

The position sensor assembly of FIG. 7 includes a sensing unit 390 that outputs a signal varying as a magnetic force varies, and a magnet 330 that is spaced apart from the sensing unit 390 and is movably disposed with respect to the sensing unit 390. The magnet 330 includes protrusion units 335 and 336 of opposite polarities that protrude from each end portion in one surface 331 toward the sensing unit 390.

The one surface of the magnet 330 forms a concave inclined surface 331 from the protrusion units 335 and 336 toward a center 337 thereof. Although the magnet 330 of FIG. 7 is different from the magnets 30 and 230 of the position sensor assembly 100 of FIGS. 1 and 5A through 5D, the position sensor assembly of FIG. 7 can precisely sense a position owing to functions of the protrusion units 335 and 336 that protrude toward the magnet sensing unit 390.

Figure 8:
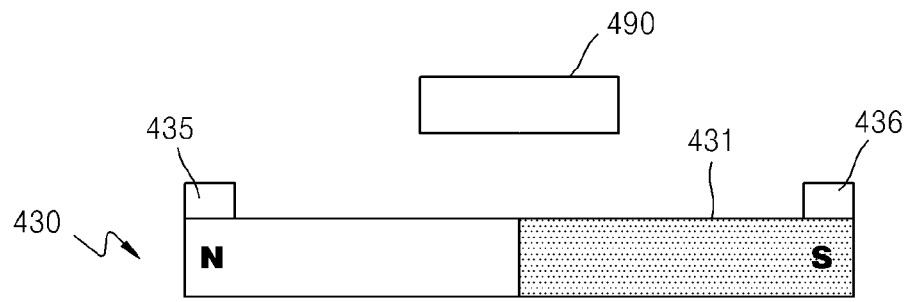
FIG. 8 is a lateral sectional view illustrating a position sensor assembly, according to another embodiment.

FIG. 8 is a lateral sectional view illustrating a position sensor assembly according to yet another embodiment.

The position sensor assembly of FIG. 8 includes a sensing unit 490 that outputs a signal varying as a magnetic force varies, and a magnet 430 that is spaced apart from the sensing unit 490 and is movably disposed with respect to the sensing unit 490. The magnet 430 includes protrusion units 435 and 436 that protrude from each end portion of both polarities in one surface 431 toward the magnet sensing unit 490.

The position sensor assembly of FIG. 8 can precisely sense a position owing to the protrusion units 435 and 436 that protrude toward the magnet sensing unit 490.

A method of forming the protrusion units 435 and 436 may use a mold having protrusion grooves corresponding to the protrusion units 435 and 436 to protrude both end portions of the magnet 430 when the magnet 430 is manufactured by sintering. Alternatively, the protrusion units 435 and 436 may be formed by attaching blocks formed of a ferromagnetic body material exhibiting strong magnetic force like iron to end portions of the magnet 430.

Figure 9:
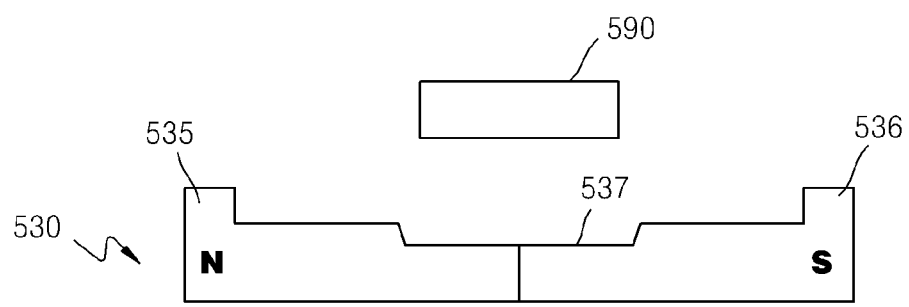
FIG. 9 is a lateral sectional view illustrating a position sensor assembly, according to yet another embodiment.

FIG. 9 is a lateral sectional view illustrating a position sensor assembly according to still another embodiment.

The position sensor assembly of FIG. 9 includes a sensing unit 590 that outputs a signal varying as a magnetic force varies, and a magnet 530 that is spaced apart from the sensing unit 590 and is movably disposed with respect to the sensing unit 590. The magnet 530 includes protrusion units 535 and 536 of opposite polarities that protrude from each end portion in one surface toward the sensing unit 590. The magnet 530 further includes a groove 537 in one surface toward the sensing unit 590.

When a space between the sensing unit 590 and the magnet 530 is reduced, linearity of a sensing signal output by the sensing unit 590 can be maintained owing to the protrusion units 535 and 536 that protrude toward the magnet sensing unit 590 and the groove 537.

According to the position sensor assemblies of the embodiments, linearity of a sensing signal output by a magnet sensing unit is enhanced owing to protrusion units of opposite polarities that protrude from each end of a magnet, thereby enabling precise sensing of a position change. Furthermore, a smaller space between the magnet and the magnet sensing unit may be provided while improving the linearity of the sensing signal output by the magnet sensing unit that senses the position change, thereby realizing a more compact design.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure. While the invention has been particularly shown and described with reference to exemplary embodiments thereof, it will be understood by those of ordinary skill in the art that various changes in form and details may be made therein without departing from the spirit and scope of the invention as defined by the following claims. Therefore, the scope of the invention is defined not by the detailed embodiments disclosed herein but by the following claims, and all differences within the scope of the disclosure will be construed as being included in the invention.

What is claimed is:

1. A position sensor assembly comprising:
a sensing unit that outputs a signal varying as a magnetic force varies; and a magnet spaced apart from the sensing unit along a first axis and movably disposed linearly with respect to the sensing unit along a second axis that is perpendicular to the first axis, and comprising protrusion units of opposite polarities that protrude along the first axis from first and second end portions of the magnet on a surface of the magnet facing toward the sensing unit such that as the magnet is moved linearly along the second axis a distance between the sensing unit and the surface of the magnet varies along the first axis due to the presence of the protrusion units.

2. The position sensor assembly of claim 1, wherein the surface of the magnet forms a concave curved surface from the protrusion units toward a center.

3. The position sensor assembly of claim 1, wherein the surface of the magnet forms a concave inclined surface from the protrusion units toward a center.

4. The position sensor assembly of claim 1, wherein a groove is formed in the surface of the magnet.

5. The position sensor assembly of claim 1, wherein the sensing unit is disposed along the first axis at a distance from the surface of the magnet such that as the as the magnet is moved linearly along the second axis a minimum distance between the sensing unit and the surface of the magnet occurs at the first and second end portions of the magnet.

6. An optical device comprising:
an optical element through which light may be transmitted;
a frame that supports the optical element;
a base that movably supports the frame;
a driving unit that generates a magnetic force to move the frame with respect to the base;
a magnet disposed in one of the frame and the base, and comprising protrusion units of opposite polarities that protrude along a first axis from first and second end portions of the magnet on a surface of the magnet wherein an edge of the magnet is aligned with a second axis that is perpendicular to the first axis; and
a sensing unit disposed in the other one of the frame and the base to correspond to the magnet, which senses a change of magnetic force according to a position change along the second axis with respect to the magnet such that as the magnet is moved linearly along the second axis a distance between the sensing unit and the surface of the magnet varies along the first axis due to the presence of the protrusion units, and
wherein the sensing unit outputs a signal.

7. The optical device of claim 6, wherein one surface of the magnet forms a concave curved surface from the protrusion units toward a center.

8. The optical device of claim 6, wherein one surface of the magnet forms a concave inclined surface from the protrusion units toward a center.

9. The optical device of claim 6, wherein a groove is formed in one surface of the magnet.

10. The optical device of claim 6, wherein the sensing unit is disposed along the first axis at a distance from the surface of the magnet such that as the as the magnet is moved linearly along the second axis a minimum distance between the sensing unit and the surface of the magnet occurs at the first and second end portions of the magnet.

11. The optical device of claim 6, wherein the driving unit comprises a coil disposed in the one of the frame and the base that comprises the sensor, wherein the frame moves with respect to the base according to a change of a magnetic force generated by the coil.

12. The optical device of claim 6, wherein the driving unit comprises an ultrasonic motor.

* * * * *